US009454959B2

(12) United States Patent
Lenke et al.

(10) Patent No.: US 9,454,959 B2
(45) Date of Patent: Sep. 27, 2016

(54) METHOD AND APPARATUS FOR PASSIVE DATA ACQUISITION IN SPEECH RECOGNITION AND NATURAL LANGUAGE UNDERSTANDING

(71) Applicant: Nuance Communications, Inc., Burlington, MA (US)

(72) Inventors: Nils Lenke, Rheinbach (DE); William F. Ganong, III, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/440,343

(22) PCT Filed: Nov. 2, 2012

(86) PCT No.: PCT/US2012/063257
§ 371 (c)(1),
(2) Date: May 4, 2015

(87) PCT Pub. No.: WO2014/070195
PCT Pub. Date: May 8, 2014

(65) Prior Publication Data
US 2015/0310859 A1    Oct. 29, 2015

(51) Int. Cl.
*G10L 15/22*   (2006.01)
*G10L 15/183*  (2013.01)
(Continued)

(52) U.S. Cl.
CPC ............ *G10L 15/18* (2013.01); *G10L 15/065* (2013.01); *G10L 15/183* (2013.01); *G10L 15/30* (2013.01); *G10L 17/00* (2013.01)

(58) Field of Classification Search
CPC .............................. G10L 15/18; G10L 15/065
USPC .................................................. 704/205–275
See application file for complete search history.

(56) References Cited

U.S. PATENT DOCUMENTS

| 2002/0091517 | A1  | 7/2002 | Frank et al. |
| 2002/0120440 | A1* | 8/2002 | Zhang ................. G10L 25/78 704/215 |

(Continued)

FOREIGN PATENT DOCUMENTS

| WO | WO 2011/151502    | 12/2011 |
| WO | WO 2011/151502 A1 | 12/2011 |

OTHER PUBLICATIONS

International Preliminary Report on Patentability for PCT/US2012/063257, dated May 5, 2015, entitled "Method and Apparatus for Passive Data Acquisition in Speech Recognition and Natural Language Understanding".

(Continued)

*Primary Examiner* — Marcellus Augustin
(74) *Attorney, Agent, or Firm* — Hamilton, Brook, Smith & Reynolds, P.C.

(57) ABSTRACT

Speech recognition systems often process speech by employing models and analyzing audio data. An embodiment of the method and corresponding system described herein allow for passive monitoring of, for example, conversation between user(s) to determine context to use to prime model(s) for later speech recognition requests submitted to the speech recognition system. The embodiment improves the results of the speech recognition system by updating speech recognition model(s) with contextual information of the conversation. This increases the probability that the speech recognition system interprets the conversation to contextually relevant information.

17 Claims, 6 Drawing Sheets

(51) Int. Cl.
  *G10L 15/18* (2013.01)
  *G10L 15/065* (2013.01)
  *G10L 17/00* (2013.01)
  *G10L 15/30* (2013.01)

(56) References Cited

U.S. PATENT DOCUMENTS

2011/0105190 A1* 5/2011 Cha ................ G06F 17/276
                                                     455/566

2016/0093296 A1* 3/2016 Bangalore ........... G10L 15/1822
                                                     704/239

OTHER PUBLICATIONS

International Search Report for International Application No. PCT/US2012/063257, title Method and Apparatus for Passive Data Acquisition in Speech Recognition and Natural Language Understanding, Date of Mailing: Sep. 9, 2013.

* cited by examiner

US 9,454,959 B2

METHOD AND APPARATUS FOR PASSIVE DATA ACQUISITION IN SPEECH RECOGNITION AND NATURAL LANGUAGE UNDERSTANDING

RELATED APPLICATIONS

This application is the U.S. National Stage of International Application No. PCT/2012/063257, filed Nov. 2, 2012, which designates the U.S., published in English. The entire teachings of the above applications are incorporated herein by reference.

BACKGROUND OF THE INVENTION

Speech recognition systems employ a plurality of models in executing speech recognition requests. Some speech recognition systems include natural language understanding models that can interpret meaning of a user's speech instead of a mere textual translation. The speech recognition system can, therefore, interpret the user's speech, and, based on its meaning, take an appropriate action that is helpful to the user.

SUMMARY OF THE INVENTION

In one embodiment, a method or corresponding apparatus includes extracting contextual information from a conversation by performing speech recognition passively in the background while a speech recognition system is inactive from executing a speech recognition request from a user. The method further includes applying the contextual information to the speech recognition system to enhance analyzing speech directed to the speech recognition system.

Applying the contextual information may include applying the contextual information to at least one of the following: an acoustic model, language model, contextual model, likely words model, vocabulary, domain-specific language model, and domain specific vocabulary.

The speech recognition system may be included in a device. The conversation may be directed to the device via an audio channel from a microphone of the device, audio channel from another device via a wired or wireless network, or internal audio channel from, for example, sound recording player application contained within the device. The speech recognition system may extract contextual information by accessing the audio channel at times before the speech recognition system is activated to perform speech recognition.

The method may further include collecting contextual information from a user, user and a third party, one or more third parties, or device outputting audio that can be interpreted as the conversation.

In one embodiment, extracting the contextual information and applying the contextual information may be performed on at least one of (i) a client device configured to record the conversation and the speech, and (ii) a server. The method can further include storing the extracted contextual information on the client device or a storage system accessible by the client device during speech recognition by the speech recognition system.

In another embodiment, the method may filter a selected speaker from the conversation by employing speaker identification or verification. Filtering may include employing speaker identification and verification by further employing speaker segmentation.

In another embodiment, the method may include weighting contextual information as a function of a time of the conversation.

In another embodiment, the method may include replacing or suppressing identifying information in the extracted contextual information.

In one embodiment, a system includes an extraction module configured to extract contextual information from a conversation by performing speech recognition passively in the background while a speech recognition system is inactive from executing a speech recognition request from a user. The system may further include an enhancement module configured to apply the contextual information to the speech recognition system to enhance analyzing speech directed to the speech recognition system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
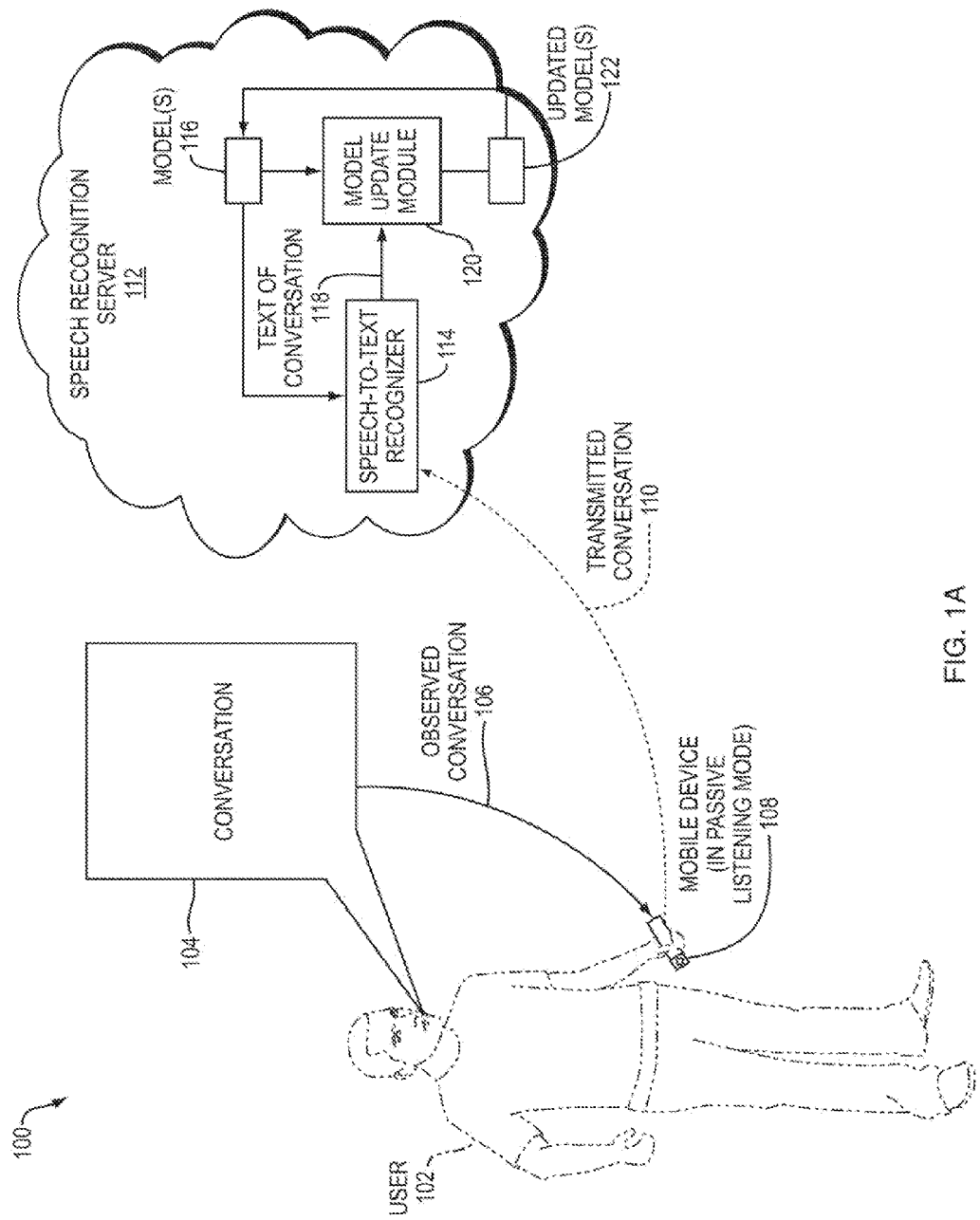
FIG. 1A is a block diagram illustrating an example embodiment of passive listening to conversation among at least one user.

FIG. 1A is a block diagram 100 illustrating an example embodiment that listens to speaking of a user 102 or conversation between user 102 and other person(s) or even an interactive voice response (IVR) system (e.g., an airline reservation system) and uses words identified to prime a model used in speech recognition. Because the listening is used to prime a model for speech recognition and is performed before the speech recognition is activated by the user, the listening may be referred to herein as "passive listening."

The user 102 has a device 108, which is in passive listening mode (i.e., "eavesdropping mode") in this example. The device 108 can include a computer system with a processor configured to recording and/or processing audio data onto a memory and a network interface to transmit the audio data and receive processed interpretations thereof. The user 102 speaks conversation 104, for example, to another person, which is observed by the device 108 as observed conversation 106. The device 108 can also observe conversation 104 by the other person or by one of multiple users 102. In passive listening mode, the device 108 employs its microphone to listen to conversation 104, optionally without an explicit request from the user 102 to listen to the conversation 104 or with approval to do so by the user (e.g., approval being granted with a setting on the device). The device 108 transmits the transmitted conversation 110 to a speech recognition server 112. In one embodiment, the server 112 can be an automated speech processing (ASP) server or a natural language understanding (NLU) server. While the method and system described herein may employ an NLU server, it can employ other types of servers as well. The server 112 can include a memory, a processor configured to process audio data, and network interface configured to receive audio data and transmit processed interpretations thereof.

The device 108 observes conversation 104 passively to determine a context of a future active request by the user. For example, if the device 108 is a mobile phone the user 102 may mention in conversation 104 a name of a particular person in the user's address book on the device 108. The device 108, by observing the conversation 104, can prime the server 112 by increasing the likelihood/probability that an explicit phone call request to the server 112 returns the name of the particular person, for example.

In another embodiment, the device 108 can be a system with speech recognition technology, such as an automobile or an entertainment center (e.g., a television or home theatre system (not shown)). If the mobile device 108 is an automobile, then the user may have a conversation 104 about a particular destination, such as a restaurant. The device 108 then primes the server 112 by increasing likelihood/probability that the particular destination is provided in a response to a speech recognition request, such as a request for a telephone number for a restaurant. In another embodiment, if the device 108 is instead an entertainment system, a user 102 may have a conversation 104 with another person about a particular program or particular performer. The device 108 then primes the server 112 to increase the likelihood/probability that the particular program or the particular performer is in the response if appropriate for an input to the server 112 by the user 102 or, in an embodiment, another person for whom priming of the server 112 is applied.

While in a passive listening mode, the device 108 transmits the transmitted conversation 110, or speech from at least one person participating in the conversation, to the speech-to-text recognizer 114 of the server 112. The speech-to-text recognizer 114 of the server 112 employs model(s) 116 to determine the text of conversation 118. The speech-to-text recognizer 114 outputs text of conversation 118 to a model update module 120. The model update module 120 analyzes the text of conversation 118 and, based on the initial model(s) 116, creates updated model(s) 122 or simply updates the model(s) to produce updated model(s). The server 112 then can replace the initial model(s) 116 with the updated model(s) 122 for future use with the speech-to-text recognizer 114 and model update module 120.

Figure 1B:
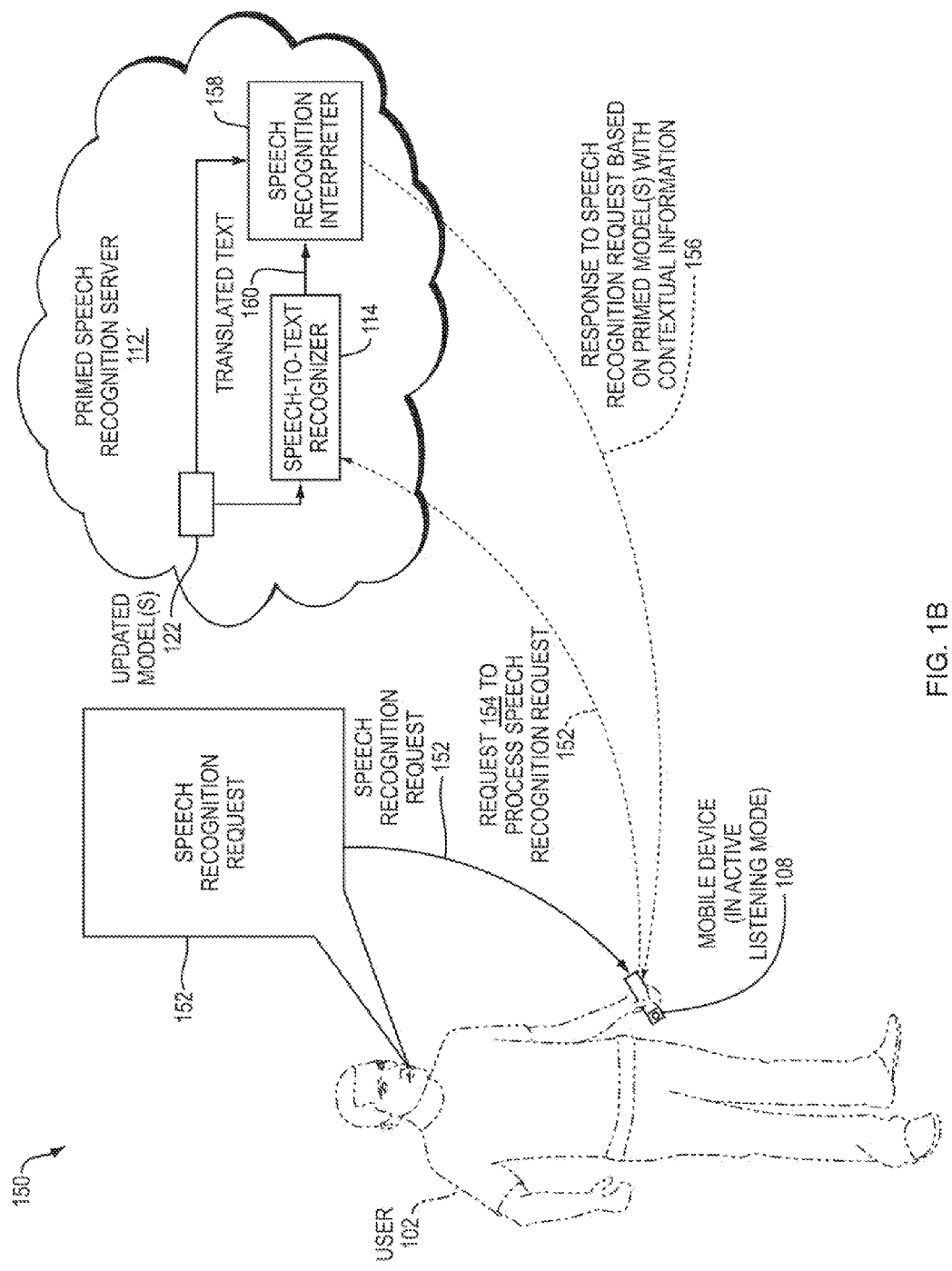
FIG. 1B is a block diagram illustrating an example embodiment of a user issuing a speech recognition request to a device that employs a primed speech recognition server.

FIG. 1B is a block diagram 150 illustrating an example embodiment of a user 102 issuing a speech recognition request 152 to a device 108 that employs a primed speech recognition server 112'. The user 102 speaks the speech recognition request 152 to the device 108 set in an active listening mode. The user 102 can set the device 108 in the active listening mode by, for example, pressing a physical button or representation of a button, moving the phone in a certain motion, or otherwise activating speech recognition, NLU, or ASP system. In active listening mode, the device 108 transmits a request 154 to process the speech recognition request 152 to the server 112. The speech recognition request 152 can be compressed to be in the form of compressed audio, for example, and the request 154 to process the speech recognition request 152 can be sent to the server 112' in the compressed form.

The speech recognition server 112 receives the request 154 at the speech-to-text recognizer 114. Based on the updated models 122, the speech-to-text recognizer 114 transmits translated text 160 to a speech recognition interpreter 158. The speech recognition interpreter 158, employing the updated model(s) 122, issues a response 156 to the request 154 to process the speech recognition request 152 based on the primed models with contextual information 156.

The device 108 receives the response 156 and can take an action based on the response 156, such as vocalizing the response 156 to the user 104, running an application, or taking another action on the device 108.

Figure 2:
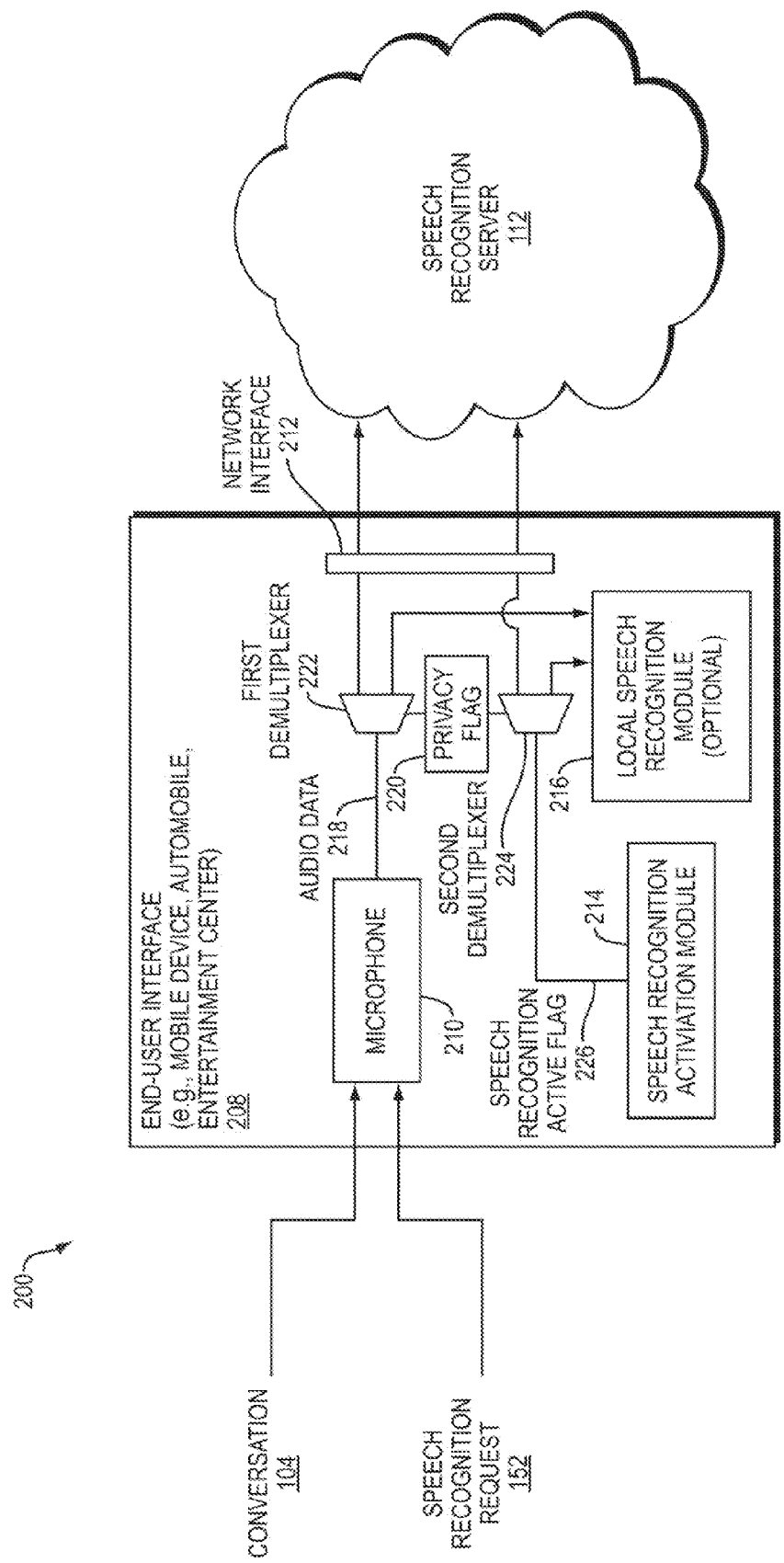
FIG. 2 is a block diagram illustrating an example embodiment of an end-user interface.

FIG. 2 is a block diagram 200 illustrating an example embodiment of an end-user interface 208. Examples of the end-user interface 208 include the device 108, a mobile phone, automobile, or entertainment center, such as a television. The end-user interface 208 receives either conversation 104 or the speech recognition request 152 at a microphone 210. The microphone 210 outputs audio data 218 of either the conversation 104 or a speech recognition request 152 to a first demultiplexer 222. The first demultiplexer is coupled to a privacy flag 220 as a selection input, which can be set by the user or otherwise set in the end-user interface 208, that determines whether speech processing occurs in the local end-user interface 208 or in a remote speech recognition server 112. If the privacy flag 220 is set, the first demultiplexer routes the audio data 218 to a local speech recognition module 216. However, if the privacy flag 220 is not set, the first demultiplexer 222 routes the audio data 218 to the speech recognition server 112 in a remote location. The audio data 218 is transferred to the speech recognition server 112 through a network interface 212.

An speech recognition activation module 214 outputs an speech recognition active flag 226 to a second demultiplexer 224. The speech recognition activation module 214 receives input from the user that activates the speech recognition (e.g., local speech recognition module 216 or speech recognition server 112) from a passive listening mode to an active listening mode. The speech recognition active flag 226 is transmitted to the local speech recognition module 216 if the privacy flag 220 is on and to the network interface 212 to transmit to the speech recognition server 112 if the privacy flag 220 is off.

The end-user interface 208, therefore, can have the microphone 210 always be in an active state such that it is always recording audio data 218. The speech recognition activation module 214 and emits a signal that determines how the audio data 218 should be treated. The audio data 218 can either be interpreted as a passively acquired conversation or an active speech recognition request to the system.

In one embodiment, the primed speech recognition server 112' can be a computer system. In this embodiment, the privacy flag 220 and speech recognition active flag 226 can be represented by data stored in a memory. The first demultiplexer 222 and second demultiplexer 224 can further be represented by a processor configured to route signals based on the privacy flag 220 and speech recognition active flag 226 in the same manner as described above. The modules described herein (e.g., speech recognition activation module 214, local speech recognition module 216), in one embodiment, can be implemented as software executed on a processor.

Figure 3:
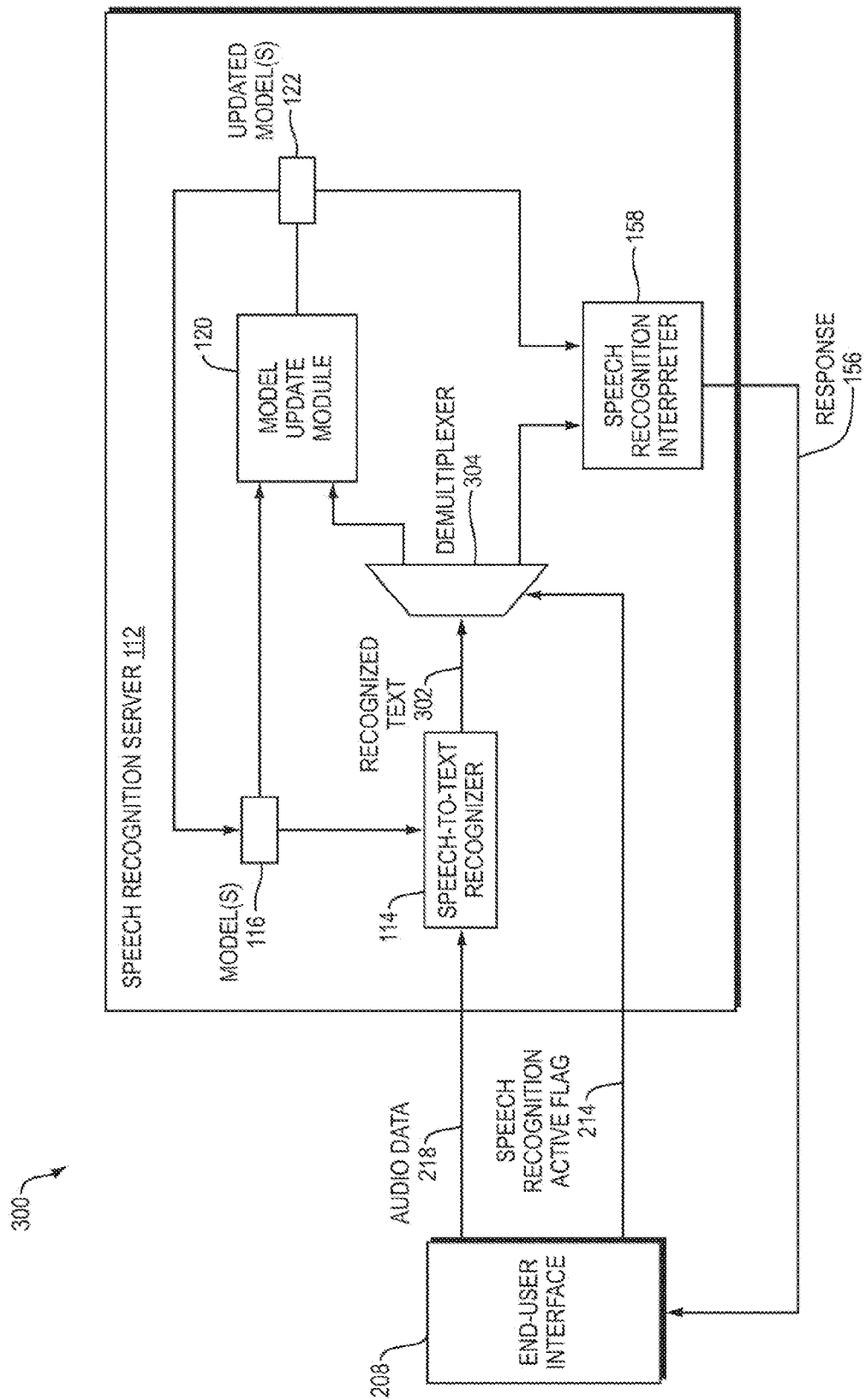
FIG. 3 is a block diagram illustrating an example embodiment of the speech recognition server that is coupled to the end-user interface in a manner similar to the embodiments described in relation to FIG. 2.

FIG. 3 is a block diagram 300 illustrating an example embodiment of the speech recognition server 112 is coupled to the end-user interface 208 in a manner similar to the embodiments described in relation to FIG. 2. In relation to FIG. 3, the end-user interface 208 outputs audio data 218 and the speech recognition active flag 214. The audio data 218 is received at a speech-to-text recognizer 114. The speech to text recognizer 114, based on model(s) 116, outputs recognized text 302 to a demultiplexer 304. The demultiplexer 304 receives the speech recognition active flag 214 as a selection input. If the speech recognition is inactive (e.g., in the speech recognition as in passive mode) then the recognized text 302 is forwarded to the model update module 120.

The model update module 120 receives the model(s) 116 and updates the model(s) 116 based on contextual information within the recognized text 302. The model update module 120 creates updated model(s) 122 based on this contextual information. Later, the end-user interface 208 issues a speech recognition active flag 214 indicating an active recognition mode to process the recognized text 302. In this case, the recognized text 302 is forwarded to the speech recognition interpreter 158. The speech recognition interpreter also receives model(s), for example the updated model(s) 122, to interpret the recognized text 302. The model(s) 116 can also be sent to the speech recognition interpreter 158 after being updated with the updated model(s) 122. After the model update module 120 creates the updated model(s) 122, model(s) 116 and updated model(s) 122 are one and the same, so which copy of the model(s) is sent to the speech recognition interpreter 158 is without much of an effect. The speech recognition interpreter 158, based on the updated models, issues a response 156 which is then sent to the end-user interface 208.

In one embodiment, the context added to the updated model(s) 122 can be slowly phased out over time. For example, context added to the updated model(s) 122 recently is more likely to be relevant to the user's active request than context added to the model(s) 122 further in the past. As an example, the context added to the model(s) can have a decreasing influence over outputted probabilities from recognizers that employ the model(s) as time passes until the context has no influence at all. In this manner, the updated model(s) 122 eventually revert to the original model(s) 116.

In another embodiment, the system can filter contextual information from only particular speaker(s). For example, the system can employ speaker identification and/or verification (e.g., a speaker identification module (not shown)) and/or a speaker verification module (not shown)). Speaker identification and/or verification isolates audio of particular speaker(s), which can be processed later. For example, this could filter out audio from a television such that only conversation of the user and the other person in the conversation is processed. In another example, this could filter out audio of any person except for the user. Speaker identification and/or verification can further employ speaker segmentation (e.g., by a speaker segmentation module). In one embodiment, a processor can be configured to implement speaker identification, speaker verification, and/or speaker segmentation.

Figure 4:
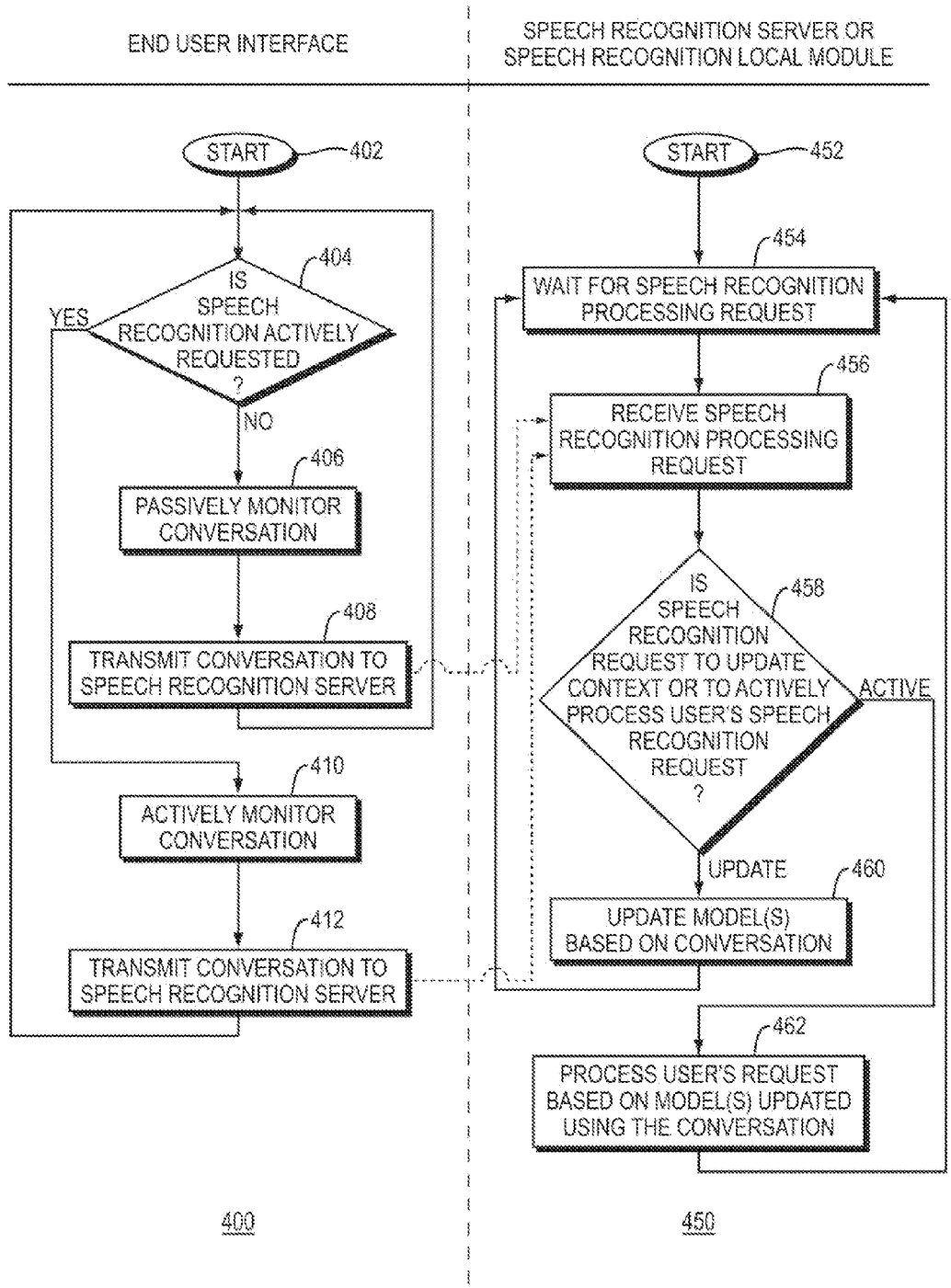
FIG. 4 is a flow diagram illustrating example processes of embodiments of the present invention.

FIG. 4 is a flow diagram illustrating example processes 400 and 450 of embodiments of the present invention. Process 400 is an example of the process at a user interface, and process 550 is an example of a process at a speech recognition server (FIGS. 1-3) or a speech recognition local module (FIG. 2). Process 400 begins with a start (402). Then, the end-user interface determines whether speech recognition is actively requested (404). If speech recognition is not actively requested, the end-user interface passively monitors conversation (406). Then, the speech recognition server transmits the monitored conversation to the speech recognition server (408). In one example, the end-user interface can compress the conversation before transmitting it to the speech recognition server. Then, the end-user interface determines again whether speech recognition is being actively requested (404).

On the other hand, if speech recognition is actively requested, the end-user interface actively monitors conversations (410). Then the end-user interface transmits the conversation to the speech recognition server (412). Then the end-user interface determines whether the speech recognition is actively requested (404). The end-user interface continues this process until the device is deactivated.

Process 450 begins with a start 452. The speech recognition server waits for an speech recognition processing request (454). Then the speech recognition server receives a speech recognition processing request from the end-user interface (456). For example, the end-user interface transmits conversation to the speech recognition server (408, 412), which is received by the speech recognition server. The speech recognition server then determines whether the speech recognition request is to update context or to actively process the speech recognition request (458). If the speech recognition request is to update context, the speech recognition server updates model(s) based on the transmitted conversation (460). For example, the speech recognition server can update a contextual model, an acoustic model, a language model, or any other model employed in the speech recognition system that can change the probabilities of an answer based on a developed set of context. Then the speech recognition server waits for a next speech recognition processing request (464).

On the other hand, if a speech recognition server does determine that the speech recognition server is to actively process the user's speech recognition request, the speech recognition processes the user's request based on the model(s), as updated using the context of the conversation (462). Further, if the active speech recognition request occurs before any contextual information is gathered, the user's request is interrupted based on the original model(s) and the speech recognition system.

Figure 5:
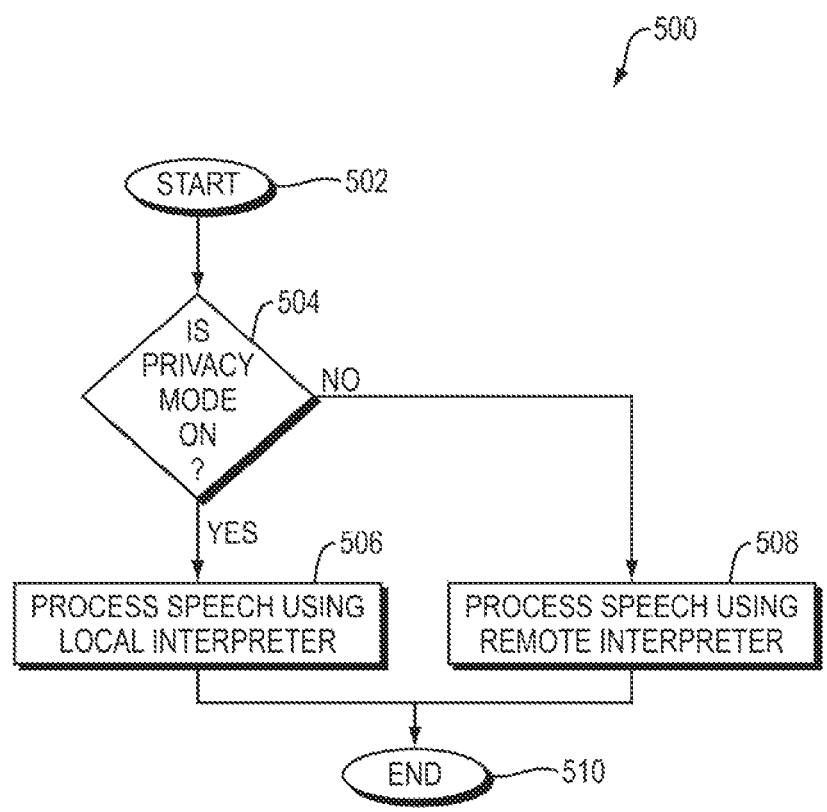
FIG. 5 is a flow diagram illustrating an example embodiment of employing a privacy mode.

FIG. 5 is a flow diagram 500 illustrating an example embodiment of employing a privacy mode. The process begins with a start (502). Then, the system determines whether a privacy mode is on (504). If the privacy mode is on, the system processes speech using a local interpreter (506). On the other hand, if the privacy mode is off, the system processes the speech using a remote interpreter (508). After speech processing (506, 508), the system ends (510).

Embodiments or aspects of the present invention may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
extracting contextual information from a conversation by performing speech recognition passively in a background while a speech recognition system is inactive from executing speech recognition requests from a user;
applying the contextual information to a model of the speech recognition system to enhance analyzing speech directed to the speech recognition system by updating the model of the speech recognition system using the contextual information from the conversation; and
processing a speech recognition request from the user, while the speech recognition system is active to execute the speech recognition request, using the updated model of the speech recognition system;
wherein the model is at least one of an acoustic model, language model, contextual model, likely words model, vocabulary, domain-specific language model, and domain specific vocabulary.

2. The method of claim 1, wherein the speech recognition system is included in a device, wherein the conversation is directed to the device via an audio channel and wherein the speech recognition system extracts contextual information by accessing the audio channel at times before the speech recognition system is activated to perform speech recognition.

3. The method of claim 1, further comprising:
collecting contextual information from at least one of a user, user and a third party, one or more third parties, or device outputting audio that can be interpreted as the conversation.

4. The method of claim 1, wherein extracting the contextual information and applying the contextual information are performed on at least one of (i) a client device configured to record the conversation and the speech, and (ii) a server, the method further comprising storing the extracted contextual information on the client device or a storage system accessible by the client device during speech recognition by the speech recognition system.

5. The method of claim 1, further comprising filtering a selected speaker from the conversation by employing at least one of speaker identification and verification.

6. The method of claim 5, wherein filtering includes employing at least one of speaker identification and verification by further employing speaker segmentation.

7. The method of claim 1, further comprising weighting contextual information as a function of a time of the conversation.

8. The method of claim 1, further comprising replacing or suppressing identifying information in the extracted contextual information.

9. A system comprising:
an extraction module configured to extract contextual information from a conversation by performing speech recognition passively in a background while a speech recognition system is inactive from executing speech recognition requests from a user;
an enhancement module configured to apply the contextual information to a model of the speech recognition system to enhance analyzing speech directed to the speech recognition system by updating the model of the speech recognition system using the contextual information from the conversation; and
a speech recognition module configured to process a speech recognition request from the user, while the speech recognition system is active to execute the speech recognition request, using the updated model of the speech recognition system;
wherein the model is at least one of an acoustic model, language model, contextual model, likely words model, vocabulary, domain-specific language model, and domain specific vocabulary.

10. The system of claim 9, wherein the speech recognition system is included in a device, wherein the conversation is directed to the device via an audio channel and wherein the speech recognition system extracts contextual information by accessing the audio channel at times before the speech recognition system is activated to perform speech recognition.

11. The system of claim 9, further comprising:
a recording module configured to collect contextual information from at least one of a user, user and a third party, one or more third parties, or device outputting audio that can be interpreted as the conversation.

12. The system of claim 9, further comprising at least one of (i) a client device configured to record the conversation and the speech, and (ii) a server, wherein the extraction module is further configured to store the extracted contextual information on at least one of the client device and a storage system accessible by the client device during speech recognition by the speech recognition system.

13. The system of claim 9, further comprising a filtering module configured to filter a selected speaker from the conversation by employing at least one of speaker identification and verification.

14. The system of claim 13, wherein the filtering module is further configured to employ speaker segmentation.

15. The system of claim 9, further comprising a weighting module configured to weigh contextual information as a function of a time of the conversation.

16. The system of claim 9, further comprising a suppression module configured to replace or suppress identifying information in the extracted contextual information.

17. A computer program product comprising non-transitory computer readable medium storing instructions for performing a method, the method comprising:
extracting contextual information from a conversation by performing speech recognition passively in a background while a speech recognition system is inactive from executing speech recognition requests from a user;
applying the contextual information to a model of the speech recognition system to enhance analyzing speech directed to the speech recognition system by updating the model of the speech recognition system using the contextual information from the conversation; and
processing a speech recognition request from the user, while the speech recognition system is active to execute the speech recognition request, using the updated model of the speech recognition system;
wherein the model is at least one of an acoustic model, language model, contextual model, likely words model, vocabulary, domain-specific language model, and domain specific vocabulary.

* * * * *